United States Patent [19]
Tanioka et al.

[11] Patent Number: 5,760,918
[45] Date of Patent: Jun. 2, 1998

[54] IMAGE PROCESSING APPARATUS WITH CONVERSION AND RECONVERSION OF THE NUMBER OF BITS PER PIXEL

[75] Inventors: Hiroshi Tanioka; Yasuhiro Yamada, both of Yokohama, Japan

[73] Assignee: Canon Kabushiki Kaisha, Tokyo, Japan

[21] Appl. No.: 183,780

[22] Filed: Jan. 21, 1994

Related U.S. Application Data

[63] Continuation of Ser. No. 587,858, Sep. 25, 1990.

[30] Foreign Application Priority Data

Sep. 27, 1989 [JP] Japan ................... 1-249202
Dec. 22, 1989 [JP] Japan ................... 1-331253

[51] Int. Cl.$^6$ .............................................. H04N 1/40
[52] U.S. Cl. .................. 358/445; 358/448; 358/455; 358/456; 382/252; 382/272
[58] Field of Search ................... 358/443, 445, 358/455, 456, 457, 458, 447, 448, 465, 466; 382/54, 52, 50, 251, 252, 270, 272

[56] References Cited

U.S. PATENT DOCUMENTS

| | | | |
|---|---|---|---|
| 4,876,610 | 10/1989 | Ohsawa et al. | 382/54 |
| 4,931,881 | 6/1990 | Matsui et al. | 358/464 |
| 5,027,221 | 6/1991 | Hisatake et al. | 358/401 |
| 5,121,446 | 6/1992 | Yamada et al. | 382/52 |
| 5,121,447 | 6/1992 | Tanioka et al. | 358/466 |
| 5,153,925 | 10/1992 | Tanioka et al. | 358/466 |

*Primary Examiner*—Thomas D. Lee
*Attorney, Agent, or Firm*—Fitzpatrick, Cella, Harper & Scinto

[57] ABSTRACT

In an image processing apparatus in which digital data of a certain number (m) of levels are converted into digital data of a larger number (n) of levels, then subjected to certain desired editing processing, and again digitized to data of the original number (m) of levels. The redigitization to m levels is conducted by determining the average density of a predetermined area, utilizing data of pixels already redigitized to m levels, and redigitizing the data of n levels into m levels, utilizing the average value. This process significantly reduces the amount of data processing required without formation of an unpleasant texture on the image resulting from errors in digitization.

14 Claims, 10 Drawing Sheets

FIG. 1A

| I(i-2,j-1) | I(i-2,j) | I(i-2,j+1) |
|---|---|---|
| I(i-1,j-1) | I(i-1,j) | I(i-1,j+1) |
| I(i,j-1) | I(i,j) | |

FIG. 1B

| C(2,1) | C(2,0) | C(2,-1) |
|---|---|---|
| C(1,1) | C(1,0) | C(1,-1) |
| C(0,1) | C(0,0) | C(0,-1) |

| f(i-2,j+1) | f(i-2,j) | f(i-2,j+1) |
|---|---|---|
| f(i-1,j-1) | f(i-1,j) | f(i-1,j+1) |
| f(i,j-1) | f(i,j) | |

FIG. 2A

| f(i-2, j-1) | f(i-2, j) | f(i-2, j+1) |
|---|---|---|
| f(i-1, j-1) | f(i-1, j) | f(i-1, j+1) |
| f(i, j-1) | f(i, j) | f(i, j+1) |

FIG. 2B

| B(i-2, j-1) | B(i-2, j) | B(i-2, j+1) |
|---|---|---|
| B(i-1, j-1) | B(i-1, j) | B(i-1, j+1) |
| B(i, j-1) | B(i, j) | |

FIG. 2C

| R(2, 1) | R(2, 0) | R(2, -1) |
|---|---|---|
| R(1, 1) | R(1, 0) | R(1, -1) |
| R(0, 1) | R(0, 0) | R(0, -1) |

| 1/28 | 3/28 | 1/28 |
|---|---|---|
| 3/28 | 5/28 | 3/28 |
| 5/28 | 7/28 | 0 |

FIG. 8A

| 1/21 | 3/21 | 1/21 |
|---|---|---|
| 3/21 | 5/21 | 3/21 |
| 5/21 | 0 | 0 |

FIG. 8B

| 1/48 | 3/48 | 5/48 | 3/48 | 1/48 |
|---|---|---|---|---|
| 3/48 | 5/48 | 7/48 | 5/48 | 3/48 |
| 5/48 | 7/48 | 0 | 0 | 0 |

IMAGE PROCESSING APPARATUS WITH CONVERSION AND RECONVERSION OF THE NUMBER OF BITS PER PIXEL

This application is a continuation of application Ser. No. 07/587,858, filed Sep. 25, 1990.

BACKGROUND OF THE INVENTION

1. Field of the Invention

The present invention relates to an image processing apparatus such as a digital copying machine, or facsimile apparatus or the like, and more particularly to an image processing apparatus for estimating a gradation image from image data already digitized into a binary or multi-level state, and the redigitizing, after a predetermined process, said image data to binary or multi-level data.

2. Related Background Art

For gradation processing of input multi-level image data into multi-level or binary data of a number of bits per pixel less than that of said input data, there are already known the so-called independently determined dither method and the conditionally determined dither method.

Also, for effecting a filter processing such as expansion, reduction or rotation, on that binary digitized image, Japanese Unexamined Patent Publication (Kokai) No.58-25767 discloses a method of inferring a gradation image from an image binarized using the independently determined dither method, applying a process to said gradation image and again binary-digitizing said gradation image.

Also, there is known, as disclosed in Japanese Unexamined Patent Publication (Kokai) No. 62-281673, a method of determining a weighted average on an image binary digitized using the error dispersion method, which is a conditionally determined dither method, inferring an appropriate multi-level value for said average, applying a desired processing thereto, and again binary-digitizing said image using the error dispersion method.

However, though such conventional methods are effective for a binary image digitized by either dither method, they require a large amount of data processing so that the processing speed is inevitably slow and the apparatus becomes expensive.

Particulary, the binary digitization by error dispersion employed in the latter method requires an especially large amount of data processing and cannot be realized in a high-speed or inexpensive apparatus.

Besides, as the error dispersion method distributes the error which occurs in the binary digitization to the image data of many pixels in the vicinity, the image inevitably becomes unsharp if image conversion between binary and multi-level (multi-bit) coding is repeated.

There is also known a multi-level pseudo-gradation processing method, in which input image data of 8-bit density levels (0–255) are digitized by a dither method into density levels of about 16 levels (4 bits) and intermediate densities are reproduced by controlling the number of recording dots and density levels thereof in a unit area. Such method is advantageous for transmission and storage of image data, since a recorded image with quality similar to that of the original image can be reproduced with a recording apparatus of a limited number of density levels and with a limited amount of data.

However, image editing after said pseudo-gradation processing is practically impossible, because image expansion or reduction by simple skipping or interpolation of thus-processed data results in the formation of extremely unpleasant textures on the image.

SUMMARY OF THE INVENTION

An object of the present invention is to eliminate the above-explained drawbacks of the prior technologies and to provide an image processing apparatus capable of converting data, digitized into m levels ($m \geq 2$), into data of n levels ($n \geq m$), and redigitizing said data of n levels, using simple hardware, into data of m levels with excellent tonal rendition and resolution.

Another object of the present invention is to provide an image processing apparatus capable of converting a binary image into a multi-level image, applying a desired image processing in this state, and converting said multi-level image again into a binary image with excellent tonal rendition and resolution with high speed and in a simple manner.

The foregoing objects can be attained, according to an embodiment of the present invention, by an image processing apparatus comprising:

converter means for receiving data digitized with m levels ($m \geq 2$) and converting said data into data of n levels ($n > m$); and redigitizing means for digitizing the data of n levels, converted by said converter means, again into data of m levels, wherein said digitizing means is adapted to determine the average in a predetermined area utilizing data already redigitized to m levels, and to digitize the data of n levels, produced by said converter means, into data of m levels based on said average.

According to another embodiment of the present invention, there is provided an image processing apparatus comprising:

first calculation means for determining a weighted average for each pixel from plural binary images in the vicinity of a contemplated pixel and the weights of a predetermined distribution;

input means for applying a predetermined image processing to a gradation image consisting of the weighted average obtained by said first calculation means and entering the data of the contemplated pixel of said gradation image;

second calculation means for determining the average density of a predetermined area utilizing the binarized data;

binarizing means for rebinarizing the data of said contemplated pixel, based on the average density obtained by said second calculation means; and correction means for compensating for the error generated in the rebinarization of the data of said contemplated pixel by said binarizing means.

Still another object of the present invention is to provide an image processing apparatus capable of minimizing the deterioration in image quality even when conversions from a binary image to a multi-level image and from a multi-level image to a binary image are repeated.

Still another object of the present invention is to provide an image processing apparatus capable of reproducing the original image from image data obtained by multi-level pseudo-gradation processing.

Still another object of the present invention is to provide an image processing apparatus capable of editing operations such as image size variation on the data obtained by pseudo-gradation processing, without formation of unpleasant textures on the image.

DETAILED DESCRIPTION OF THE PREFERRED EMBODIMENTS

Now the present invention will be explained in detail by reference to the preferred embodiments thereof, shown in the attached drawings.

[1st Embodiment]

At first the principle of an embodiment of the present invention will be explained with reference to FIGS. 1A to 1C.

Figure 1A:
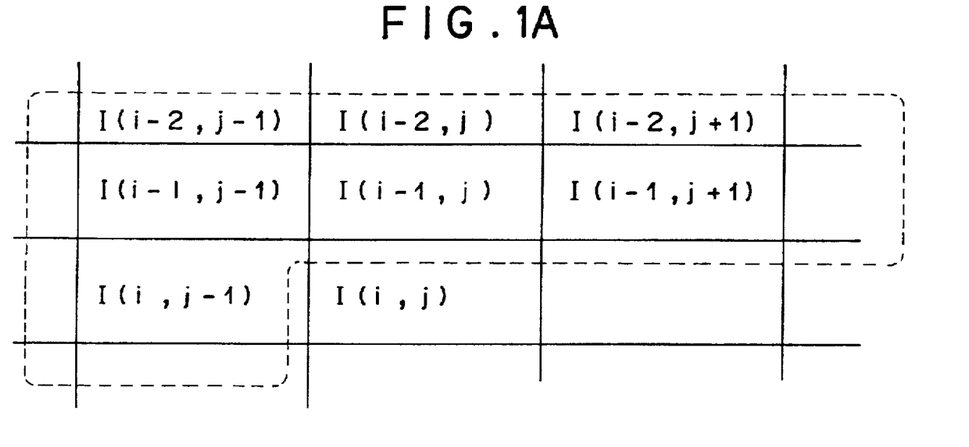
FIG. 1A is a view of binary densities of plural pixels in an input image in a first embodiment of the present invention.

FIG. 1A shows binary data in plural pixels of an input image.

I(i, j) indicates binary data, normalized at "0" or "1", of an input pixel to be converted to multi-level data, at the object pixel position. In the pixels above the broken line, the data input is already completed, and binary data are temporarily stored for use in the data processing of the object pixel.

Figure 1B:
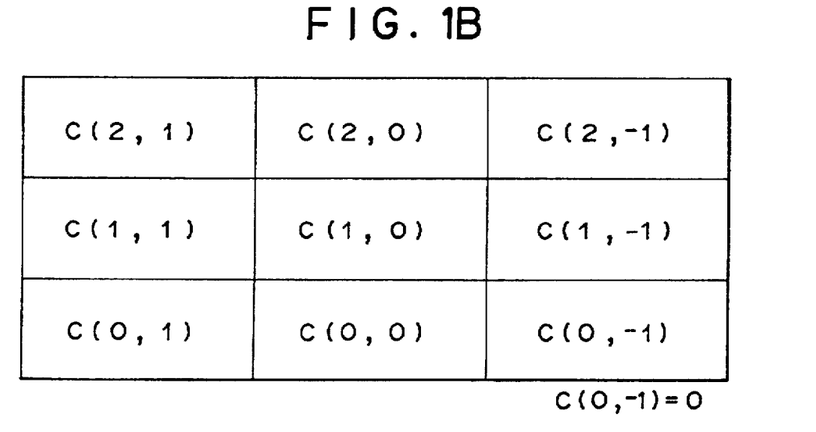
FIG. 1B is a view of a weighting mask for plural pixels in said first embodiment of the present invention.

FIG. 1B shows a weighting mask C for determining the average density, composed of a 3×3 matrix, wherein the weight for a binary pixel to be entered next is C(0, −1)=0.

Figure 1C:
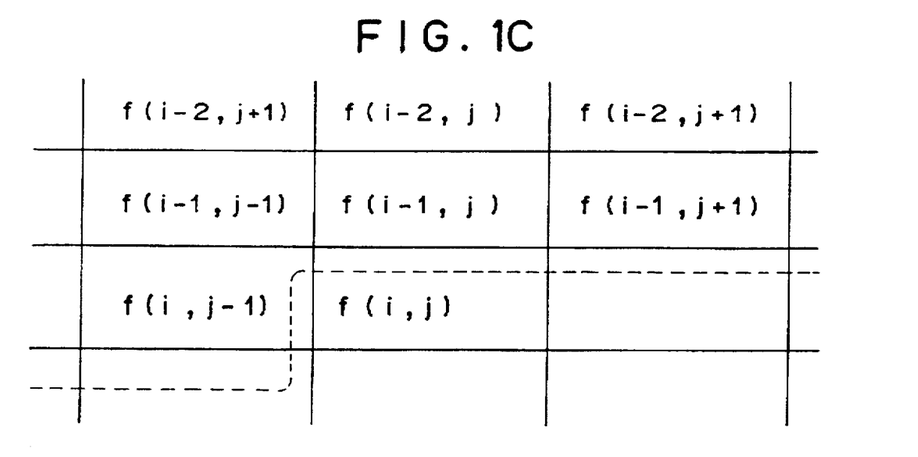
FIG. 1C is a view of multi-level data in the vicinity of the contemplated pixel, reproduced in said first embodiment.

FIG. 1C shows multi-level data (in a range from 0 to 1), in the vicinity of the object pixel, restored according to the process of the present embodiment, wherein the multi-level datum f(i, j) is obtained from the entered binary datum I(i, j) according to the following equation:

$$f(i,j) = \sum_{x=0}^{2} \sum_{y=-1}^{1} C(x, y) \cdot I(i-x, j-y) \quad (0)$$

The weighting mask shown in FIG. 1B preferably has larger values in positions closer to the object pixel position.

The area of said weighting mask is not limited to 8 pixels shown in FIG. 1B, but is preferably free from particular directionality in perpendicular two or four directions starting from the object pixel position.

In the following there will be explained the principle of binary digitizing in case the restored multi-level data f(i, j) are subjected to a process such as image size modification or filtering and then to binary redigitization.

Figure 2A:
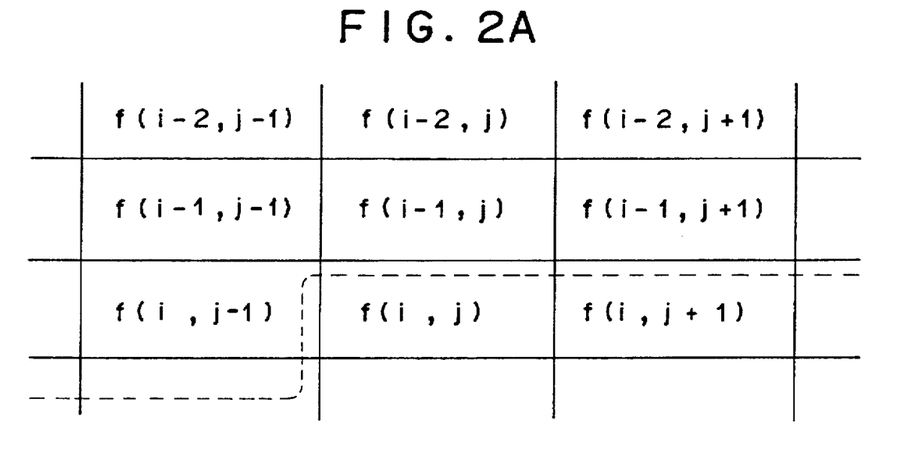
FIG. 2A is a view of multi-level data of plural pixels in said first embodiment of the present invention.

In FIG. 2A, f(i, j) indicates multi-level density data, in a normalized range from 0 to 1, at the object pixel position to be binary digitized. Pixels above the broken line have already been rebinarized, and, after the rebinarization of the object pixel, the same process will be conducted in succession in the order of pixels f(i, j+1), f(i, j+2), . . .

Figure 2B:
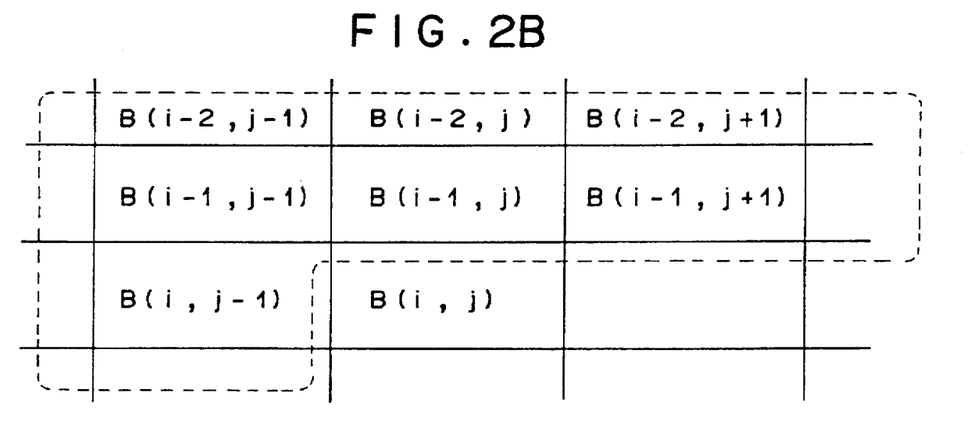
FIG. 2B is a view of binarized images in plural pixels in said first embodiment.

FIG. 2B shows the binarized image data, wherein B(i, j) indicates the density ("0" or "1") of the object pixel after rebinarization. The broken-lined frame indicates pixel data which have already been rebinarized at the time of rebinarization of the object pixel and are utilized in said rebinarization of the object pixel.

Figure 2C:
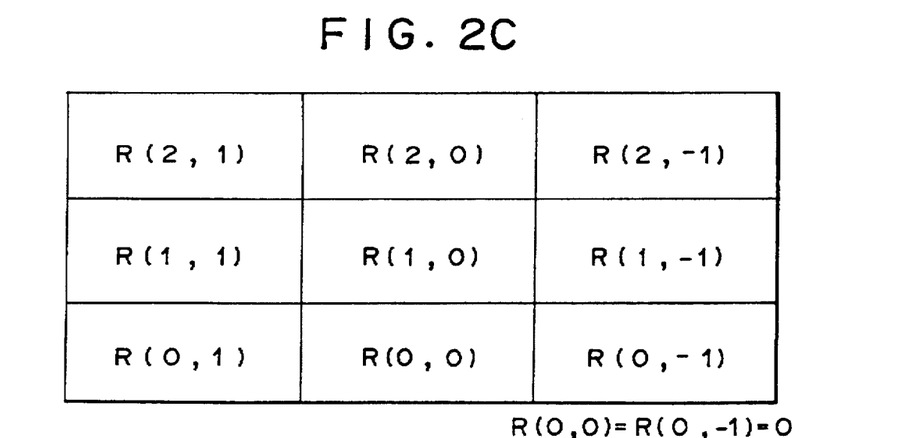
FIG. 2C is a view of a weighting mask for plural pixels in said first embodiment.

FIG. 2C shows an example of weighting mask R for determining the average density, composed of a 3×3 matrix, wherein the weights for unbinarized pixels are R(0, 0)=R(0, −1)=0.

In the present embodiment, the weighted average density m(i, j) of the binary images in the vicinity of the object pixel is determined by:

$$m(i,j) = \sum_{x=0}^{2} \sum_{y=1}^{1} R(x, y) \cdot B(i-x, j-y) \quad (1)$$

The object pixel f(i, j) is binarized according to the following equations (2), utilizing said average density m(i, j) and an already assigned binarizing correction value E(i, j):

$B(i, j)=1$ if $f(i, j)+E(i, j)>m(i, j)$  $E(i, j+1)=f(i, j)+E(i, j)-m(i, j)$ $B(i, j)=0$ if $f(i, j)+E(i, j) \leq m(i, j)$  $E(i, j+1)=f(i, j)+E(i, j)-m(i, j)$ however:

$B(i, j)=1$ if $f(i, j)+E(i, j)=m(i, j)=1$. (2)

Figure 3A:
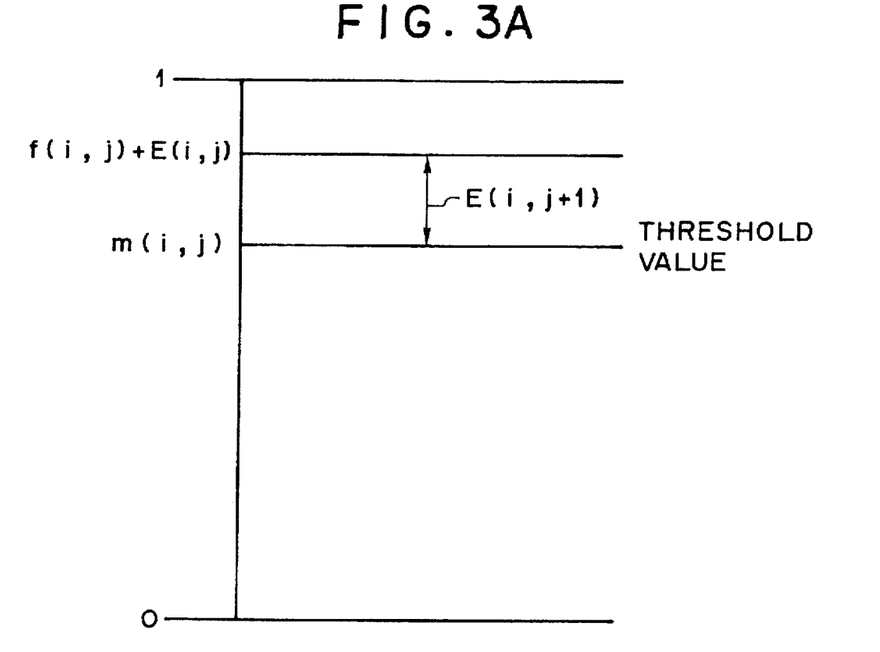
FIGS. 3A and 3B are charts showing the principle of the binarizing process in said first embodiment.
Figure 3B:
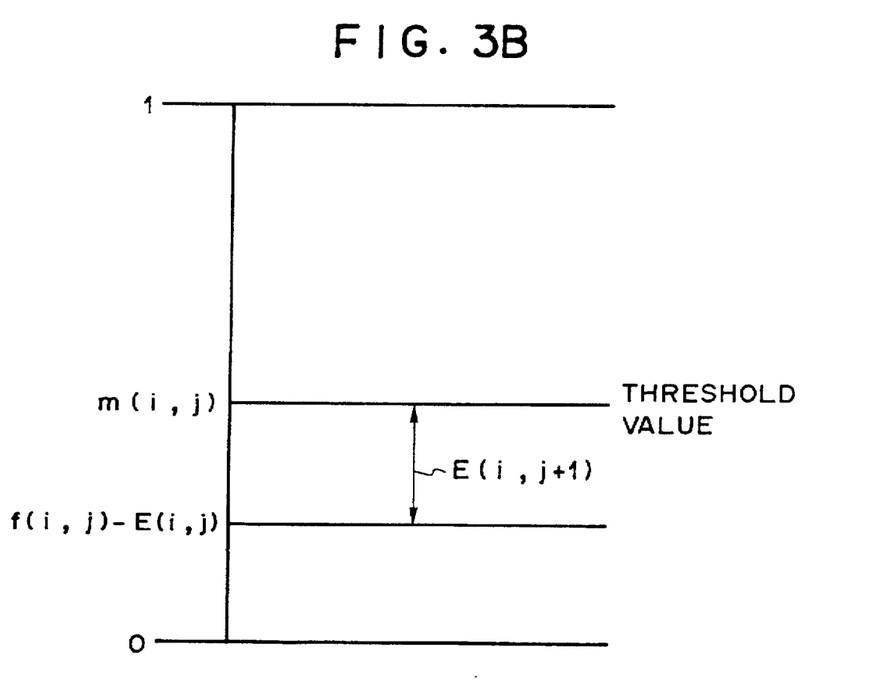

FIGS. 3A and 3B illustrate graphically the equations (2).

In said equations (2), E(i, j) is an error in the binarization of a pixel (i, j−1) immediately preceding the object pixel (i, j), from the multi-level density f(i, j−1) into the binary density B(i, j−1), namely the difference between the multi-level density f(i, j−1) and the average density m(i, j−1) in the vicinity.

Thus, the density of the input image can be completely conserved, in average, in the image after binarization, by binarization of a value obtained by adding said binarization error E(i, j) to the density f(i, j) of the object pixel.

Such a process taking the binarizing error into consideration allows significantly improvement in the ability for reproducing the tonal rendition.

In equations (2), E(i, j+1) is the error distributed to the density f(i, j+1) of a pixel (i, j+1) immediately succeeding the object pixel (i, j).

The binarizing process of the present embodiment has an image reproducing ability equivalent to or superior to that of the error dispersion method despite the extremely reduced amount of data processing as explained above. This is because, though the above-mentioned error is compensated for only in an adjacent pixel, there is obtained an effect equivalent to the distribution of the error to plural pixels by determining the average density from plural rebinarized data.

In the present embodiment, the error E(i, j+1) in the binarization of the next pixel is defined as:

$$E(i, j+1)=0 \text{ if } |f(i, j)+E(i, j)-m(i, j)|>\alpha \quad (3)$$

wherein α is a constant
otherwise:

$$E(i, j+1)=f(i, j)+E(i, j)-m(i, j) \quad (4)$$

Thus, in the comparison of the average density m and the density of the object pixel at the binarization, if the density of the object pixel is within a predetermined range close to the average density m (if the error between the average density m and the density of the object pixel is within a predetermined range) as shown in equations (3) and (4), the difference between said average density and the object pixel density is distributed as the correction value in the rebinarization of the next pixel.

On the other hand, if the object pixel density is outside said range, namely if the error between the object pixel density and the average density is sufficiently large, said correction value is selected as "0", and correction is not conducted at the rebinarization of the next pixel.

Stated differently, the error correction is made only when the image is identified to have a gradation, from a relatively small density change in the vicinity of the object pixel. In such case the difference from the average density, resulting from rebinarization, is corrected in the next pixel, whereby a smooth density change of the image can be faithfully processed in a pseudo-gradation processing. In this manner tonal rendition of the image can be improved.

On the other hand, the error correction is not conducted when the density of the object pixel is identified to show a rapid change from the image density in the vicinity, as in an edge portion of a character or a line. In such case the correction value is made "0", whereby the rebinarization is conducted without loss in the resolving power resulting from the density conservation. In this manner the resolving power can be improved in such edge portion.

According to the process featuring the present invention, in a gradation image area identified from the above-explained change in image density, the image density is conserved in the rebinarized image, utilizing the error in the rebinarization process. On the other hand, in a non-gradation image area requiring a high resolving power such as characters, the image is not corrected for the error in binarization but is made close to the average density m, in order to prevent loss in image sharpness resulting from such density conservation.

Figure 4:
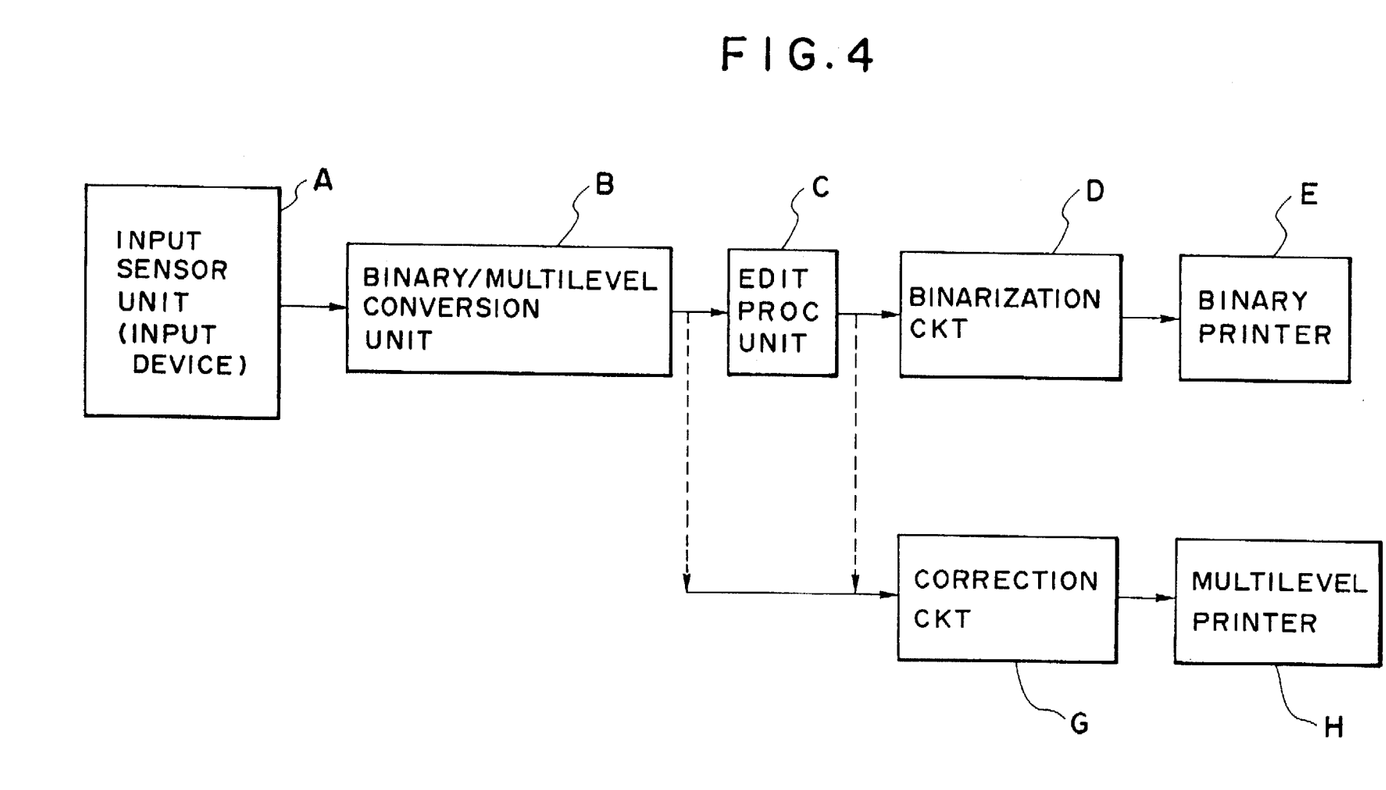
FIG. 4 is a block diagram of an image processing apparatus constituting said first embodiment.

FIG. 4 is a block diagram of an image processing apparatus of the present invention, utilizing the process featuring the above-explained embodiment.

In FIG. 4, an input sensor unit A binarizes a read image by means of a photoelectric converting device such as a CCD and a driving device therefor, or decodes an encoded binary image such as facsimile signal to release a binary image signal. The binary data released from said input sensor unit A are supplied in succession to a binary/multi-level conversion unit B, which restores each pixel into 6-bit multi-level digital data, thereby providing a multi-level image with 64 levels.

The restored multi-level data are sent to an editing process unit C and are subjected therein to a known data editing process, such as image size conversion (for example from an A3-sized input image into A4 size), pixel density conversion between facsimile G4 and G3 formats, edge enhancement or smoothing. After such editing, the multi-level data are supplied to a binarization circuit D for pseudo-gradation processing featuring the present embodiment, and then are converted into a visible image by a binary printer E represented by a laser beam printer, an ink jet printer or a thermal recording apparatus.

If desired, a multi-level printer H may be employed for direction recording on the multi-level data supplied from the binary/multi-level conversion unit B or from the editing process unit C as shown in FIG. 4.

In such case, a correction circuit G is provided for digital correction processing such as correction for unevenness in the CCD sensor in the input sensor unit A and/or shading correction for the unevenness in the illuminating light source.

Figure 5:
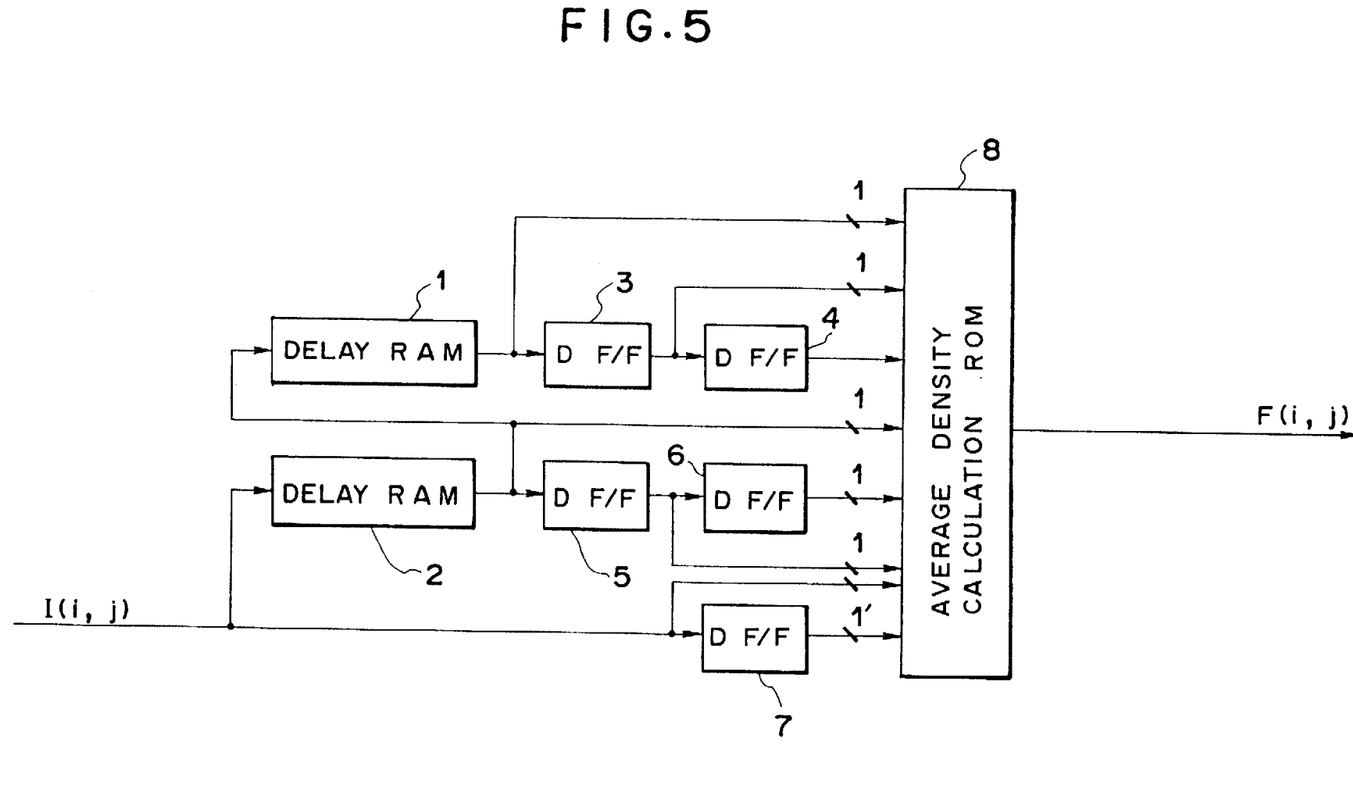
FIG. 5 is a block diagram showing the details of a binary/multi-level conversion unit in the first embodiment.

FIG. 5 is a block diagram showing the details of the binary/multi-level conversion unit B shown in FIG. 4.

In FIG. 5, there are shown delay RAMs 1, 2 each for storing input binary data of a line; D-flip-flops (DF/F) 3–7 for delaying said binary data by a pixel; and an average density calculating ROM 8 for calculating the average density of a predetermined area from the binary data in the vicinity of the object pixel and restoring the datum of the object pixel as a multi-level data f(i, j).

When the datum I(i, j) of the object pixel is entered, the above-explained circuit provides binary data corresponding to I(i, j−1) in FIG. 1A, at the output terminal of the DF/F 7. Also in response to the entry of the datum of said object pixel, a binary datum I(i−1, j+1), delayed by one line, is released at the output terminal of the delay RAM 2 which delays the binary data by about a line. The obtained data are supplied to the RAM 1, whereby a binary datum I(i−2, j+1), delayed by two lines by means of two RAM's 2, 1, is supplied to the average density calculating ROM 8.

Also said average density calculating ROM 8 receives I(i−2, j) from the DF/F 3, I(i−2, j−1) from the DF/F 4, I(i−1, j) from the DF/F 5, I(i−1, j−1) from the DF/F 6, and I(i, j−1) from the DF/F 7.

When all the binary data are supplied to the input terminals of the ROM 8, the results of the above-explained calculations of equation (0) can be easily read from a table in said ROM 8.

Figure 6:
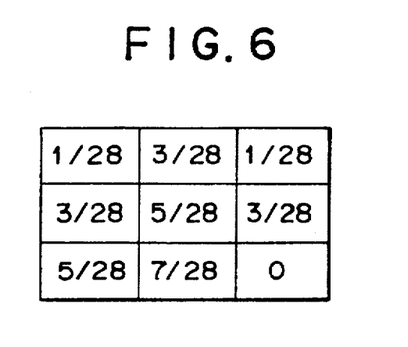
FIG. 6 is a view showing an example of a weighting mask employed in the binary/multi-level conversion unit.

FIG. 6 shows an example of the weighting mask, which is to determine the average value from the binary data of the object pixel and of 7 pixels in the vicinity of the object pixel.

In order to normalize to the 6-bit density levels (0–63) of the actually entered image data, the values (obtained by equation (0)) of the weighting mask shown in FIG. 6 are multiplied by 63 and stored as 6-bit values in the average density calculating ROM table.

Figure 7:
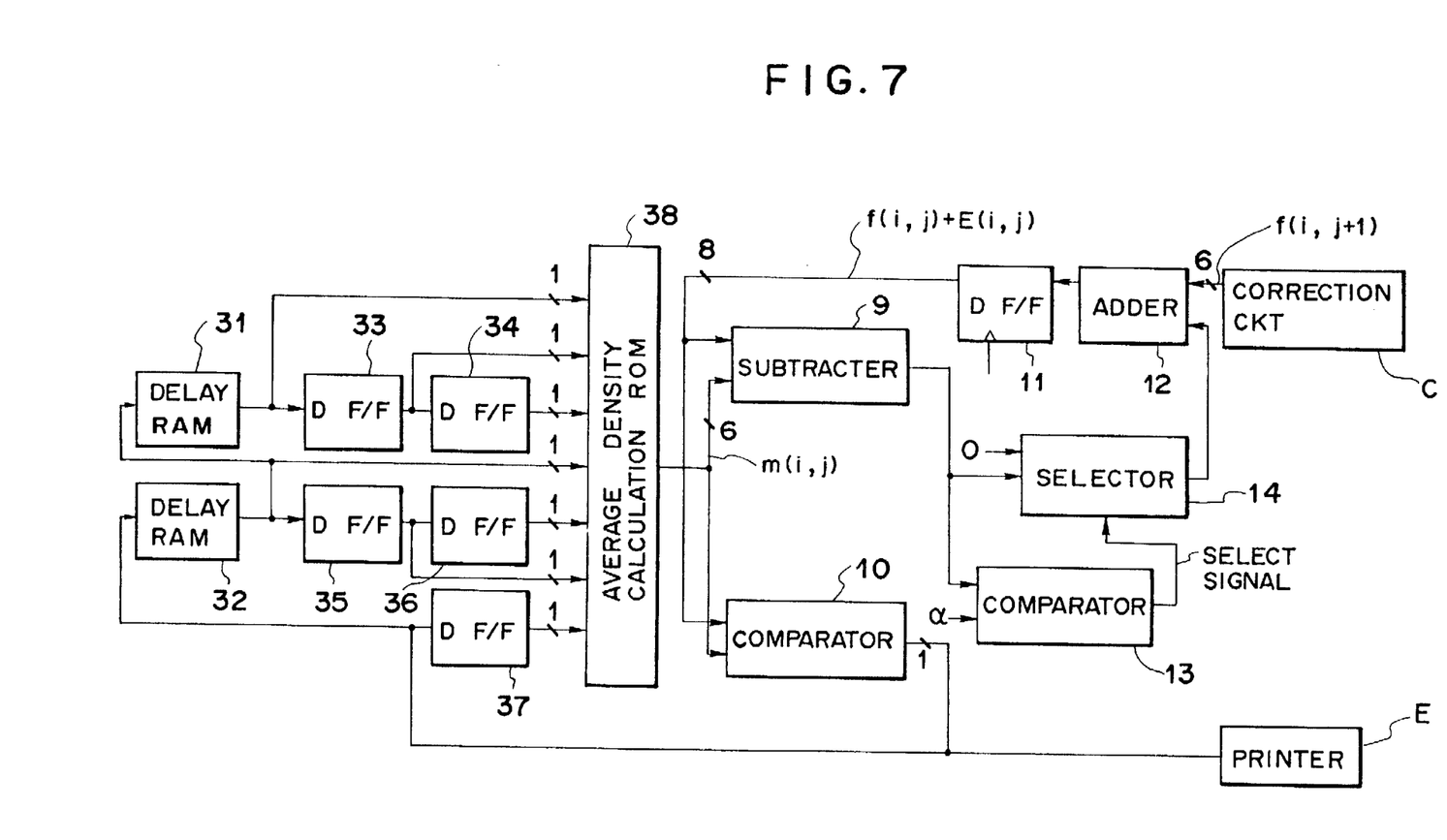
FIG. 7 is a block diagram showing the details of a binarization circuit employed in the first embodiment.

FIG. 7 is a detailed block diagram of the binarization circuit D shown in FIG. 4.

In FIG. 7 there are shown delay RAMs 31, 32 each for delaying binarized data for a line; D-flip-flops (DF/F) 33–37 for delaying the binary data by a pixel; an average density calculating ROM 38 for calculating the average density of a predetermined area from the binary data in the vicinity of the object pixel and releasing the obtained average density as the threshold value for binarizing the datum of the object pixel; a comparator 10 for comparing the multi-level datum of the object pixel with the threshold value released from said ROM 38; a D-flip-flop (DF/F) 11 for delaying the multi-level data from an adder 12 for a clock cycle period; an adder 12 for adding either of the error data released from a subtracter 9 or "0", selected by a selector 14, to a 6-bit multi-level datum supplied from the correction circuit; a comparator 13 for comparing the difference between the multi-level datum of the object pixel from the subtracter 9 and the threshold value with a predetermined value $\alpha$; and a selector 14 for selecting either the output of the subtracter 9 or a signal "0" according to a selection signal from said comparator 13.

In the above-explained circuit, the comparator 10 releases a 1-bit datum B(i, j) rebinarized according to equations (2). Said binarized datum is supplied to the RAM 32 for the delay of a line. A binary datum B(i−1, j+1) delayed by one line in the RAM 32 is supplied to the RAM 31, and a binary datum B(i−2, j+1) delayed by two lines in the RAM's 32, 31 is supplied to the average density calculating ROM 38.

Said ROM 38 also receives datum B(i−2, j) from the DF/F 33, B(i−2, j−1) from the DF/F 34, B(i−1, j) from the DF/F 35, B(i−1, j−1) from the DF/F 36 and B (i, j−1) from the DF/F 37.

The above-mentioned binary data are binary images of the pixels in the vicinity of the input image f(i, j) as shown in FIG. 2. The average density calculating ROM 38 stores results of the equations (1) and (2) for determining the threshold value m(i, j), and can therefore "calculate" said threshold value at a high speed by entering said binary data to the input addresses of the ROM 38.

The obtained threshold value is supplied to the subtracter 9 and the comparator 10.

Said subtracter 9 and the comparator 10 receive f(i, j)+E(i, j) from the DF/F 11.

From these input signals, the subtracter calculates the difference of right- and left-hand terms in the relation (2) as follows:

$$E(i, j+1)=f(i, j)+E(i, j)-m(i, j) \quad (5)$$

On the other hand, the comparator 10 compares f(i, j)+E(i, j) with m(i, j) and releases binary datum B(i, j).

The error E(i, j+1), obtained in the subtracter 9 according to the equation (5), is supplied to the selector 14 and the comparator 13.

The comparator 13 compares said error E(i, j+1) with the constant a according to equation (3), and, based on the result of said comparison, sends a selection signal to the selector 14.

In response to said selection signal from the comparator 13, the selector 14 releases either E(i, j+1)=0 if the absolute value of said error E(i, j+1) is larger than $\alpha$, or the output of the subtracter 9 without change, if said absolute value of the error E(i, j+1) is equal to or smaller than $\alpha$.

Said error E(i, j+1) is added, by the adder 12, to the input image datum f(i, j+1), and the DF/F 11 delays the obtained sum by a clock cycle period.

The binarizing operation is conducted in succession, by the repetition of the above-explained process.

Figure 8A:
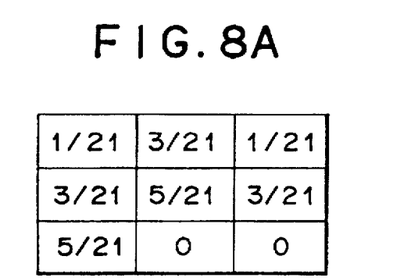
FIGS. 8A and 8B are views showing examples of weighting masks employed in the binarization circuit of FIG. 7.
Figure 8B:
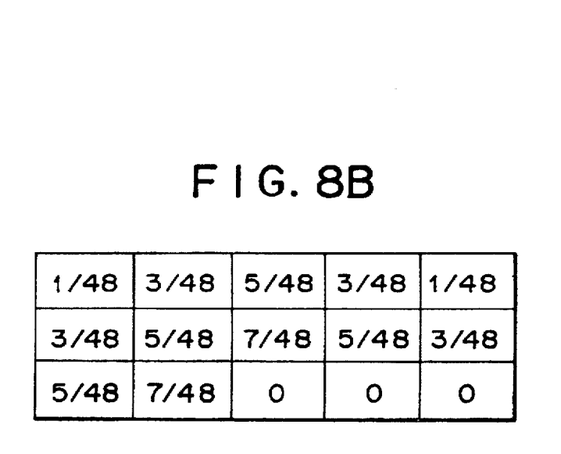

FIGS. 8A and 8B show examples of the weighting mask.

The mask shown in FIG. 8A is to determine the average from binary data of 7 pixels in the vicinity of the object pixel.

Also the mask shown in FIG. 8B is to determine the average from binary data of 12 pixels in the vicinity. In the present embodiment, in order to normalize to the 6-bit density levels (0–63) of the actually entered image data, the values (obtained by the equation (0)) of the weighting table shown in FIG. 8A are multipled 63 times and are stored in the form of 60 bit values in the average density calculating ROM 38.

As explained in the foregoing, the process of the present embodiment allows to reduce the amount of data processing in comparison with that of the average density approximation method, since the binarization of the input multi-level data is conducted with a threshold value which is the average density calculated only from already rebinarized data. In addition the tonal rendition can be significantly improved since the correction for the error between the input multi-level data and the average density, generated at the binarization of the input multi-level data, is corrected only when said error is within a predetermined range.

Besides, as said error between the average density and the input multi-level datum is not corrected if said error exceeds said predetermined range, it is rendered possible to prevent loss in resolving power resulting from the conservation of image density, and to reproduce edge portions in the image clearly.

In the present embodiment, the binarizing error E is distributed only to the next pixel, but the present invention is not limited to such embodiment. For example, the ability for reproducing tonal rendition can be improved even with a small weighting mask, by distributing the error E to plural pixels in the main scanning direction, such as 3E(i, j+1)/4 to pixel (i, j+1) and E(i, j+1)/4 to pixel (i, j+2).

It is also possible to distribute said error E to plural pixels which are two-dimensionally displaced from the object pixel present in the vicinity with predetermined distribution factors, as in the error dispersion method.

Such method somewhat complicates the hardware structure, but improves the reproducibility of image, since a uniform images can be obtained not only in the main scanning direction but also in the sub-scanning direction.

The values of the foregoing weighting masks become larger in the pixels closer to the object pixel position, but the distribution of said values is not limited. It is also possible to utilize pixels which are not directly adjoining to the object pixels.

The binary/multi-level conversion process explained above can satisfactorily restore the multi-level image from any image binarized by the minimum average error method, error dispersion method, Bayer's dither method or above-explained binarizing method of the present embodiment. In addition, said binary/multi-level conversion method is not limited to the foregoing embodiment but is subject to various modifications.

For example, in the case of a binary image which is binarized by a so-called dot fattening dither method in which each dot is composed of 64 or 32 pixels, there is preferably employed a weighting mask larger than that shown in FIG. 6, such as a mask of 4×4 pixels or 6×6 pixels, in order to eliminate low-frequency periodicity of dots concentrated at the input of binary image, particularly in low- or high-density image areas. If it is known that a particular input image was obtained by such dither method, the weighting mask is preferably switched to a larger one in such case.

The "calculations" based on the weighting mask in the present embodiment are conducted by a LUT in a ROM, but said calculations can naturally be achieved with plural adders because said calculations only involve multiplications and summations of 1-bit data and constants. Furthermore, said calculations may also be achieved with an integrated circuit such as a gate array, in order to reduce the cost of the apparatus.

The foregoing embodiment deals with only one kind of input data, but the present invention is applicable also to a color image by employing input data of three (R, G and B) colors.

As explained in the foregoing, the first embodiment of the present invention allows temporary restoration of a multi-level image from binary image with a simple hardware, application of desired image processing to the multi-level image, and then reconversion of the edited image into a binary image with excellent tonal rendition and resolving power with simple hardware.

In addition the binarizing method of said embodiment is capable of minimizing the loss in image sharpness even when the conversion between binary image and multi-level image and the image editing are repeated, since the error generated in the binarization is distributed only to the next pixel.

[2nd Embodiment]

In the following will be explained a second embodiment of the present invention, in which image data, digitized to n levels ($n \geq 3$; less than that of the input image data), are converted to m levels ($m > n$), the same as that of the input image data, then subjected to an editing process such as image size modification, and again redigitized to n levels.

In the following there will be explained a case where n=4 and m=8.

Figure 9:
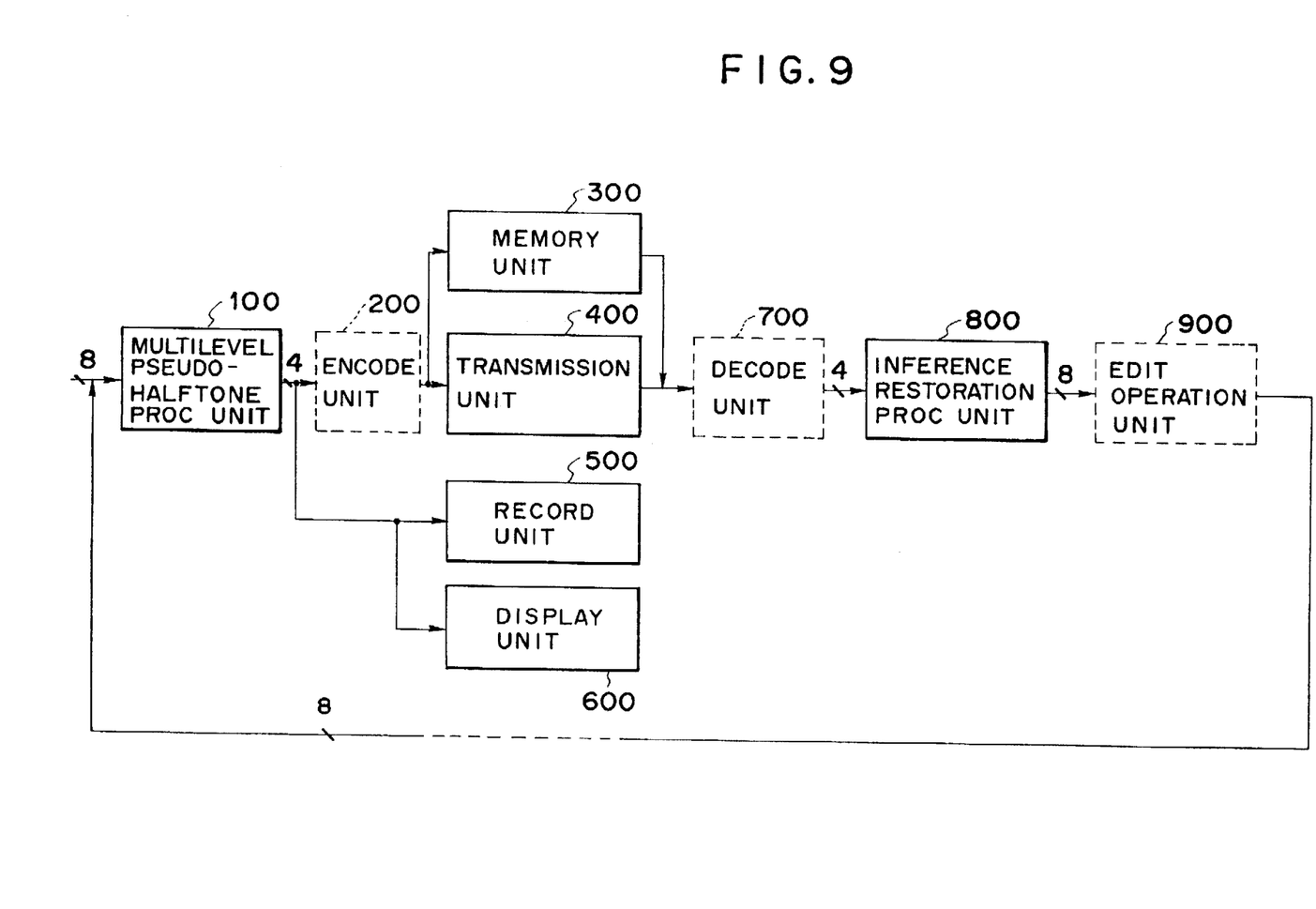
FIG. 9 is a block diagram of an image processing apparatus constituting a second embodiment of the present invention.

FIG. 9 shows an image signal processing system of an image processing apparatus constituting the second embodiment.

A multi-level pseudo-halftone process unit 100 compresses 8-bit image signal to 16 levels (4 bits). The obtained 4-bit signal can be, either in this form or after further data compression in an encoding unit 200, stored in a memory unit 300 or transmitted by a transmission unit 400 to an external equipment. On the other hand, said 4-bit signal may be used in a recording unit 500 capable of recording with 16 levels, such as a laser beam printer, for obtaining a hard copy image of quality comparable to that of the original 8-bit signal. Furthermore, it may be displayed with high quality in a display unit 600 composed for example of a cathode ray tube.

The transmitted or stored data are decoded in a decoding unit 700, and restored as an 8-bit image signal substantially identical with the original image signal, in an inference restoration process unit 800. Said 8-bit restored signal is subjected, in an editing process unit 900, to an image editing process, such as density conversion between 400 dpi and 16 pel, or an image size reduction from A3 size to B4 size. Thereafter the signal is again converted to 16 levels in a pseudo-halftone process unit 100 for display or recording.

In the following there will be given more detailed explanation on the multi-level pseudo-halftone process unit 100 and the inference restoration process unit 800, which principally feature the present invention.

In the following description there will be considered 8-bit input pixel data f(i, j) (0–255) and 4-bit multi-level data B(i, j) (0–15) obtained by a pseudo-halftone process. A weighted average $m_n(i, j)$ (0–255) can be obtained from the following equation, by multiplying the data of five pixels, including those of four pixels adjacent to the contemplated object pixel position of the input image data and already subjected to a pseudo-halftone processing and the predicted datum n (=0–15) of said object pixel to be subjected to pseudo halftone processing, by the weighting coefficients shown in FIG. 9 and adding the obtained products:

$$m_n(i, j)=1 \times B(i-1, j-1)+4 \times B(i, j-1)+1 \times B(i+1, j-1)+4 \times B(i-1, j)+7(i,j)$$

wherein n is a value in a range from 0 to 15 predictable as B(i, j).

Then, through the comparison of the corrected data f'(i, j) obtained by the correction, to be explained later, of the object pixel datum f(i, j) and the average $m_n(i, j)$ obtained by the equation (1), there is determined a multi-level value n satisfying the following relation:

$$m_{n-1}(i, j) \leq f'(i, j) < m_n(i, j) \quad (2)$$

and the conversion to 16 levels is conducted, based on said n, $m_n(i, j)$ and $m_{n-1}(i, j)$, in the following manner:

$$B(i, j)=n \text{ if } f'(i, j) > \tfrac{1}{2}\{m_{n-1}(i, j)+m_n(i, j)\}$$

$$B(i, j)=n-1 \text{ if } f'(i, j) \geq \tfrac{1}{2}\{m_{n-1}(i, j)+m_n(i, j)\} \quad (3)$$

In this manner there can be achieved multi-level digitization by a multi-level pseudo-halftone process. In the following there will be explained the error E in multi-level digitization. Said error E is defined as follows:

$$E=f'(i, j)-m_n(i, j) \text{ if } B(i, j)=n, \text{ or}$$

$$E=f'(i, j)-m_{n-1}(i, j) \text{ if } B(i, j)=n-1 \quad (4)$$

and is distributed to the input image data of two adjacent pixels in the following manner:

$$f'(i+1, j) \leftarrow f(i+1, j)+E/2$$

$$f'(i, j+1) \leftarrow f(i, j+1)+E/2 \quad (5)$$

Consequently the corrected object pixel data f'(i, j) mentioned above contains two error correcting components generated in the multi-level pseudo-halftone processing of two pixels orthogonally adjacent to the input datum f(i, j). The conversion from the 8-bit input signal f(i, j) into the 4-bit signal B(i, j) can be achieved in this manner.

Figure 10:
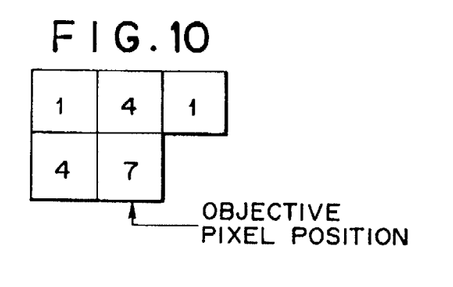
FIG. 10 is a view showing weighting coefficients employed in said second embodiment.

FIG. 10 is a detailed block diagram of the multi-level pseudo-halftone processing unit 100, wherein a line memory 101 and D-flip-flops (DF/F) 102, 103, 106, of 4-bit width, respectively delay the multi-level digitized data by a line and a pixel, whereby the multiplications of weighting coefficients shown in FIG. 9 on 4 pixels can be conducted simultaneously. Outputs of 1-bit 4-times multipliers 104, 105, output of the line memory 101 and output of the DF/F 103 are added in an adder 107 to obtain a value corresponding to $m_0(i, j)$ in equation (1).

As equations (3) can be respresented as:

$$B(i, j)=n \text{ if } f'(i, j) > m_0(i, j)+\tfrac{1}{2}\{7n+n(n-1)\}$$

$$B(i, j)=n-1 \text{ if } f'(i, j) \leq m_0(i, j)+\tfrac{1}{2}\{7n+7(n-1)\} \quad (3')$$

the multi-level digitization into 16 levels can be conducted, based on f'(i, j) and $m_0(i, j)$, in the following manner:

$B(i, j) = \text{if } 7 \geq 2\{f'(i, j) - m_0(i, j)\} > -7$ $B(i, j) = 1 \text{ if } 21 \geq 2\{f'(i, j) - m_0(i, j)\} > 7$ $B(i, j) = 14 \text{ if } 203 \geq 2\{f'(i, j) - m_0(i, j)\} > 189$ $B(i, j) = 15 \text{ if } 2\{f'(i, j) - m_0(i, j)\} > 203.$ \hfill (6)

The signal $m_0(i, j)$ is supplied to a multi-level digitization circuit 108 composed of plural comparators and adders. Said circuit 108 also receives the corrected image data f'(i, j) to be explained later, and the multi-level digitized data obtained according to equations (2), (3), or comparisons (6) are supplied to the line memory 101 and the DF/F 106.

At the same time, said circuit 108 sends a divided error E/2, according to equation (4), to an error memory 109 and an error correcting adder 110. Said adder 110 receives, from the error memory 109, also the error generated at the multi-level digitization of the pixel preceding by a line, and adds these error correcting components to the pixel data, thereby completing the error correction. The above-explained operations are repeated for each pixel. The multi-level digitization circuit 108 may also be composed of a look-up table in a ROM.

In the following there will be explained the inferred restoration of the 4-bit multi-level data, obtained by the multi-level pseudo-halftone process, into 8-bit signal. The above-mentioned multi-level pseudo-halftone process merely consists of replacing the input pixel data with a weighted average of adjoining five pixels. Consequently an average f"(i, j), very close to the original f(i, j), can be obtained with the same weighting coefficients as shown in FIG. 9, in the following manner:

$f''(i, j) = 1 \times B(i-1, j-1) + 4 \times B(i, j-1) + 1 \times B(i+1, j-1) + 4 \times B(i-1, j) + 7 \times B(i, j) - f(i, j)$ Restoration to a state very close to the original signal f(i, j) is thus possible.

Figure 11:
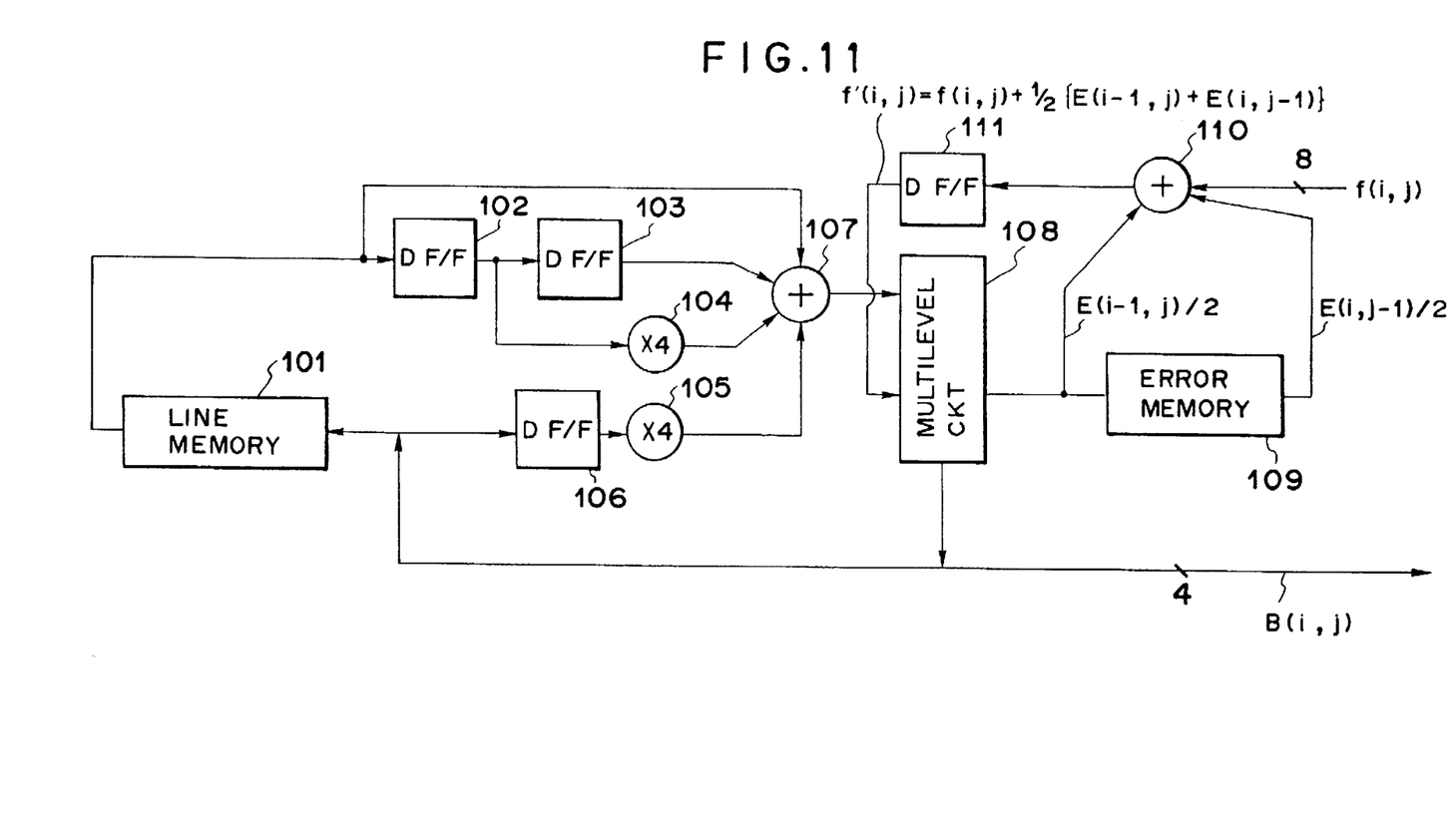
FIG. 11 is a block diagram showing the structure of a multi-level pseudo-gradation processing unit employed in said second embodiment.
Figure 12:
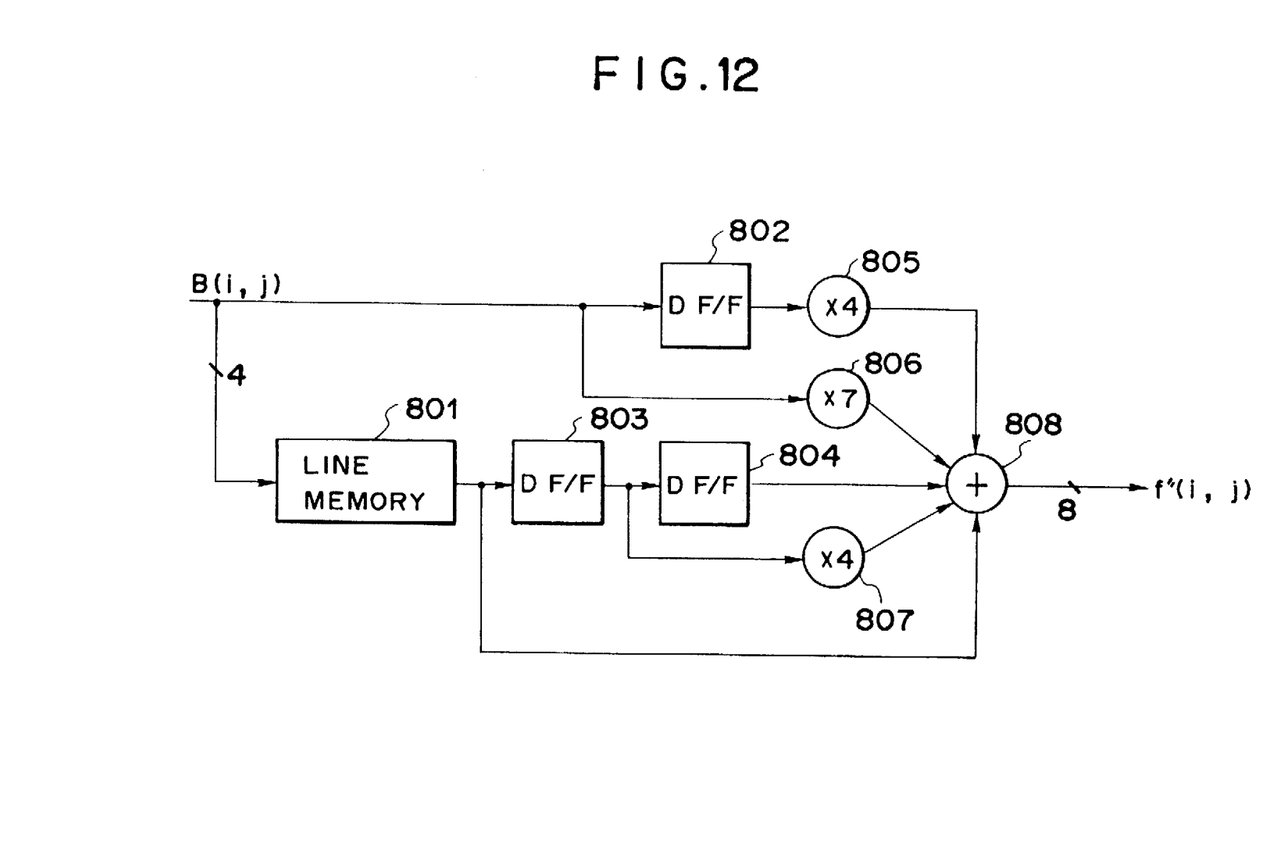
FIG. 12 is a block diagram showing the structure of an inference restoration process unit employed in said second embodiment.

FIG. 11 is a detailed block diagram of the inferred restoration unit 800.

4-bit multi-level data are stored for one line and for one pixel respectively in a line memory 801 and DF/F's 802, 803, 804, then multiplied in multipliers 805, 806, 807 by weighting coefficients shown in FIG. 9 and are added in an adder 808. Since the total sum of the weighting coefficients is 17, the obtained result naturally becomes 255 when all the multi-level data are 15.

Though the present embodiment employs multi-level digitization to 4 bits, it can be likewise applied to 8 levels with 3 bits, and the present invention is not limited to gray particular numbers of levels (values of n and m).

Also, the values of the weighting coefficients and the number of weighted pixels are not limited to those in the foregoing embodiment. Furthermore, the weighting coefficients at multi-level digitization are preferably the same as those in the inferred restoration, but the process of the present embodiment is satisfactorily realizable even when said coefficients are mutually different.

As explained in the foregoing, the second embodiment can provide an image processing apparatus for effecting multi-level pseudo-halftone process capable of image restoration faithful to the original image.

Also there can be provided an image processing apparatus capable of restoring the image data, subjected to the above-mentioned multi-level pseudo-halftone process, to the original image.

Furthermore there can be provided an image processing apparatus capable of image editing is process, such as image size variation, on the data subjected to the multi-level pseudo-halftone process, without formation of unpleasant texture on the image.

Though the present invention has been explained by reference to the preferred embodiments thereof, it is not limited to such embodiments and is subject to various modifications or variations within the scope and spirit of the appended claims.

I claim:

1. An image processing apparatus comprising:

converter means for receiving data digitized with m levels (m≧2) and converting said data into data of n levels (n>m);

data processing means for executing data processing on the data of n levels produced by said converter means; and digitizing means for digitizing the data of n levels, data-processed by said data processing means, again into redigitized data of m levels, wherein said digitizing means is adapted to determine an average of a predetermined area, utilizing data already redigitized to m levels, and to convert the data of n levels, produced by said data processing means, into the redigitized data of m levels based on said average.

2. An apparatus according to claim 1, wherein said converter means is adapted to receive binary data subjected to binary digitization, and to convert said binary data into multi-level data, utilizing a weighting mask having a weighted distribution.

3. An apparatus according to claim 2, wherein said digitizing means is adapted to binary-digitize the multi-level data produced by said data processing means.

4. An apparatus according to claim 3, wherein said digitizing means is adapted to determine the average density in a predetermined area, based on plural binary data already subjected to binary digitization, and to binary-digitize the multi-level data produced by said data processing means, utilizing said average density as a threshold value.

5. An apparatus according to claim 3, wherein said data processing means is adapted to apply a predetermined editing process to the multi-level data obtained by said converter means, and said digitizing means is adapted to binary-digitize the multi-level data which has been subjected to said editing process by said data processing means.

6. An apparatus according to claim 1, further comprising correction means for compensating for error generated in the digitization of the data of n levels into the data of m levels by said digitizing means.

7. An apparatus according to claim 6, wherein said correction means is adapted to compensate for said error only when said error is larger than a predetermined value.

8. An image processing apparatus comprising:

first calculation means for determining a weighted average for each pixel by multiplication and addition of plural binary image data in the vicinity of an object pixel and weighting coefficients of a predetermined distribution;

input means for applying a predetermined image processing to the average calculated by said first calculation means, considering said average as a multi-level image value, and entering a multi-level value datum of said object pixel;

second calculation means for determining the average density of a predetermined area;

binary digitizing means for again binary-digitizing the multi-level value datum of said object pixel, based on the average density obtained by said second calculation means; and correction means for compensating for the error generated in the binary digitization of the datum of said object pixel by said binary digitizing means, wherein said second calculation means determines the average density using binary data rebinarized by said binary digitizing means.

9. An image processing apparatus comprising:

converter means for receiving data digitized with m levels (m≧2) and converting the data into data of n levels (n>m);

data processing means for executing data processing on the data of n levels produced by said converter means; and digitizing means for digitizing the data of n levels, data-processed by said data processing means, again into redigitized data of m levels, wherein said digitizing means digitizes the data of n levels produced by said data processing means into the redigitized data of m levels utilizing data already redigitized to m levels and an error generated in the digitization, and wherein said digitizing means is adapted to determine an average density in a predetermined area, based on plural redigitized data from said digitizing means, and to digitize the data of n levels produced by said data processing means, utilizing the average density.

10. An apparatus according to claim 9, wherein m=2 and wherein said converter means is adapted to receive binary data which has been subjected to binary digitization, and to convert the binary data into the data of n levels utilizing a weighting mask having a weighted distribution.

11. An apparatus according to claim 10, wherein said digitizing means is adapted to binary-digitize the data of n levels produced by said data processing means.

12. An apparatus according to claim 11, wherein said data processing means is adapted to apply a predetermined editing process to the data of n levels obtained by said converter means, and wherein said digitizing means is adapted to binary-digitize the data of n levels which has been subjected to said editing process by said data processing means.

13. An image processing method comprising the steps of:

receiving data digitized with m levels (m≧2) and converting the data into data of n levels (n>m);

data processing the data of n levels produced in said receiving and converting step; and digitizing the data of n levels, data-processed in said data processing step, again into redigitized data of m levels, wherein, in said digitizing step, an average of a predetermined area is determined, utilizing data already redigitized to m levels, and the data of n levels produced in said data processing step is converted into the redigitized data of m levels based on the average.

14. An image processing method comprising the steps of:

receiving data digitized with m levels (m≧2) and converting the data into data of n levels (n>m);

data processing the data of n levels produced in said receiving and converting step; and digitizing the data of n levels, data-processed in said data processing step, again into redigitized data of m levels, wherein, in said digitizing step, the data of n levels produced in said data processing step is digitized into the redigitized data of m levels utilizing data already redigitized to m levels and an error generated in the digitization, and wherein said digitizing step is adapted to determine an average density in a predetermined area, based on plural redigitized data from said digitizing step, and to digitize the data of n levels produced by said data processing step, utilizing the average density.

* * * * *

UNITED STATES PATENT AND TRADEMARK OFFICE
CERTIFICATE OF CORRECTION

PATENT NO. : 5,760,918

DATED : June 2, 1998

INVENTOR(S) : HIROSHI TANIOKA, ET AL.

It is certified that error appears in the above-identified patent and that said Letters Patent is hereby corrected as shown below:

Title page, item [57],

IN THE ABSTRACT

Line 1, "in which" should be deleted.

COLUMN 1

Line 44, "Particulary," should read --Particularly,--.

COLUMN 4

Line 66, "significantly" should read --significant--.

COLUMN 5

Line 45, "the" (second occurrence) should be deleted.

COLUMN 7

Line 51, "constant a" should read --constant $\alpha$--.

COLUMN 8

Line 36, close up right margin;
Line 37, close up left margin; and
Line 39, "images" should read --image--.

UNITED STATES PATENT AND TRADEMARK OFFICE
CERTIFICATE OF CORRECTION

PATENT NO. : 5,760,918

DATED : June 2, 1998

INVENTOR(S) : HIROSHI TANIOKA, ET AL.

It is certified that error appears in the above-identified patent and that said Letters Patent is hereby corrected as shown below:

COLUMN 10

Line 6, "7(x1n)" should read --7xn-- and insert "(1)" at right margin.

Signed and Sealed this

Twenty-ninth Day of June, 1999

Attest:

Q. TODD DICKINSON

Attesting Officer    Acting Commissioner of Patents and Trademarks